UNITED STATES PATENT OFFICE.

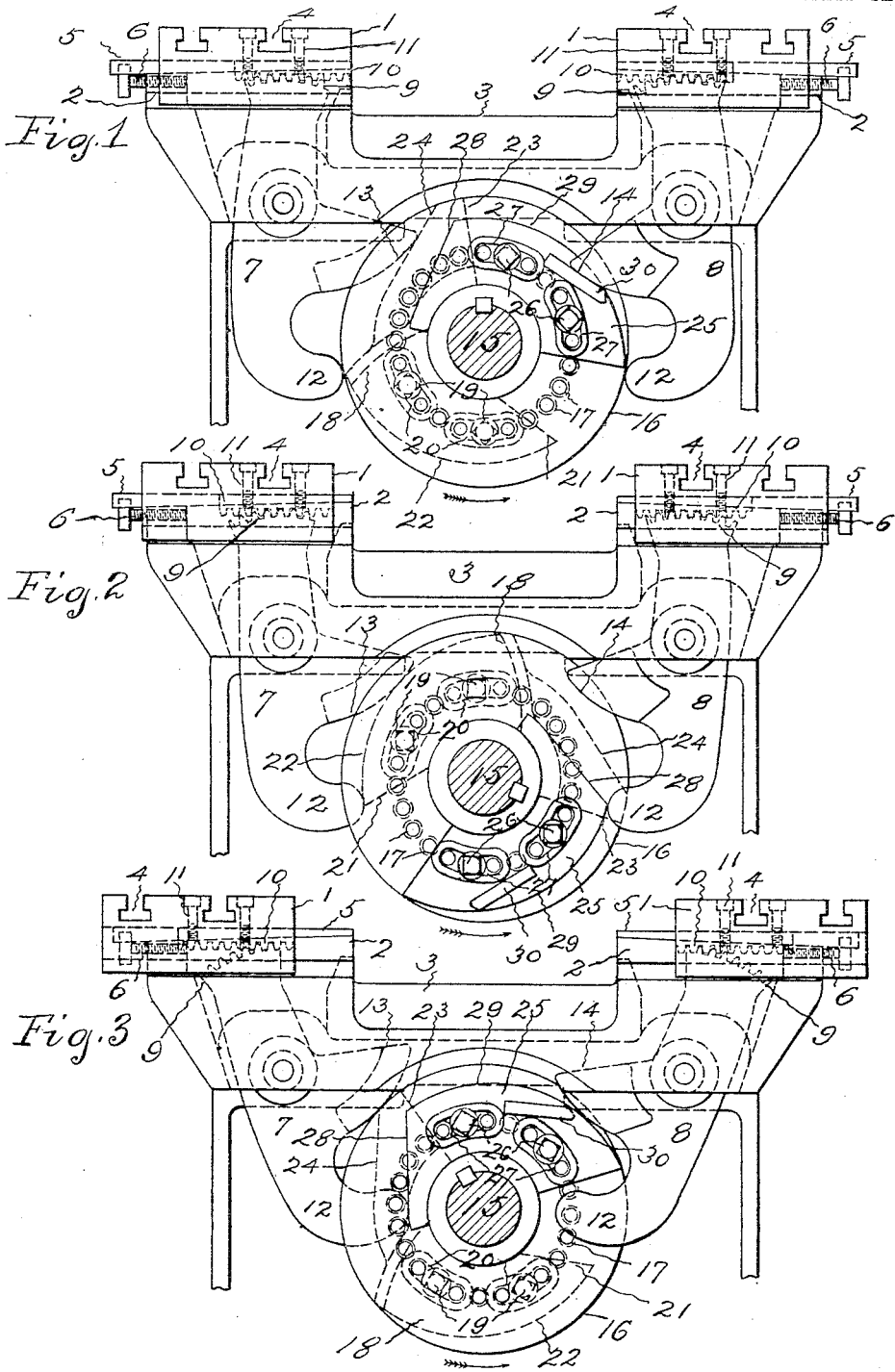

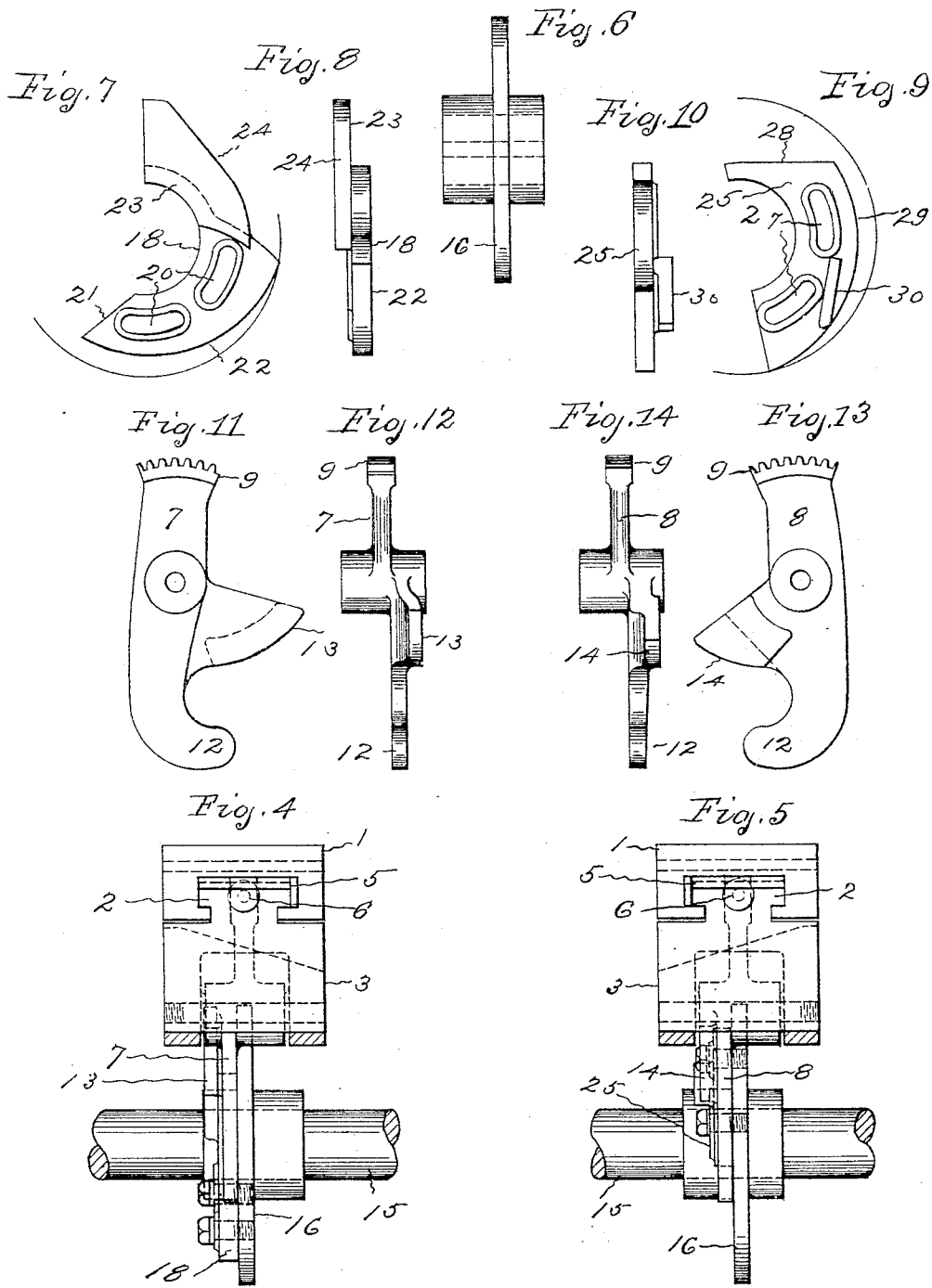

HARRY BURDETT LESTER, OF DAYTON, OHIO, ASSIGNOR TO THE DAVIS SEWING MACHINE COMPANY, OF DAYTON, OHIO, A CORPORATION OF OHIO.

CROSS-SLIDE-OPERATING MECHANISM.

957,224.  Specification of Letters Patent.  Patented May 10, 1910.

Application filed September 27, 1909. Serial No. 519,709.

*To all whom it may concern:*

Be it known that I, HARRY BURDETT LESTER, a citizen of the United States, residing at Dayton, in the county of Montgomery and State of Ohio, have invented a new and useful Improvement in Cross-Slide-Operating Mechanism, of which the following is a specification.

This invention relates to mechanism designed for operating the cross slides, or the slides which carry the cutting-off, turning down, or other forming tools, that move radially with relation to the stock, of turret lathes, multiple and single spindle screw machines, and the like automatic forming machine tools.

It is necessary in machines of the above mentioned classes that the transverse tool slides should be so moved toward and from the stock, that the tools which they carry will not interfere with the action of the longitudinally movable tools that are carried by the turret or other tool holder, which latter tools have longer or shorter distances to travel, according to the lengths of the cuts to be made on the pieces of stock to be threaded or formed. It is essential to efficiency that the mechanisms which move the cross slides should be so designed that the transverse tools will act very quickly, and that these mechanisms be so adjusted that the cutting-off or other forming tools will travel only the distance that is required to accomplish the desired cut, that is, from the periphery of the stock to the center, which of course varies, according to the diameter of the stock, and not waste time in traveling a greater distance than is necessary, and thus retard the cutting action of the longitudinally movable tools.

The object of this invention is to provide a mechanism for actuating the transversely movable tool slides of a machine tool, very quickly and only the necessary distance to accomplish the desired cut, so that the radially movable tools which such slides carry will operate in the shortest possible time and without conflict with the longitudinally movable tools. This object is attained by providing positively operating mechanisms which move the radial tool slides very rapidly up to and away from the stock, regardless of the length of the stock to be operated upon, and which mechanisms are readily adjustable so that whatever the diameter of the stock, such tools will only move the necessary distance.

Figure 1 in the accompanying drawings shows a side elevation of a double cross slide operating mechanism which embodies this invention, with the parts in the positions occupied when the cross slides are moved way in, as after the cuts have been completed. Fig. 2 shows a side elevation of the same with the parts in the positions occupied after the cross slides have been moved rapidly in toward the stock, and just before the cutting is to commence. Fig. 3 shows a side elevation of the same with the parts in the positions occupied after the cross slides have been rapidly moved out or back from the stock. Fig. 4 shows an edge view of the slide on the left of Fig. 1, and the mechanism for operating that slide. Fig. 5 shows an edge view of the slide on the right of Fig. 1, and the mechanism for operating that slide. Fig. 6 shows an edge view of the single cam disk upon which the cam blocks are adjustably mounted for actuating both slides. Fig. 7 shows a face view of the cam block that is adjustably secured to one side of the cam disk for actuating the slide lever shown on the left of Fig. 1. Fig. 8 shows an edge view of the cam block shown in Fig. 7. Fig. 9 shows a face view of the cam block that is adjustably secured to the other side of the cam disk for actuating the slide lever shown on the right of Fig. 1. Fig. 10 shows an edge view of the cam block shown in Fig. 9. Fig. 11 shows a face view of the cam lever for operating the slide on the left of Fig. 1. Fig. 12 shows an edge view of the lever shown in Fig. 11. Fig. 13 shows a face view of the cam lever for operating the slide on the right of Fig. 1. Fig. 14 shows an edge view of the lever shown in Fig. 13.

Each of the slides 1 of the mechanism illustrated is mounted on a guide 2 formed on the top of the frame 3. Each slide has grooves 4 for holding the tool post or holder, and between the slide and the top of the guide is a gib 5 adjustably secured in position by a screw 6.

The upper ends of the levers 7 and 8 which are pivotally attached to the frame, are engaged in any desired manner with the cross slides. In the machine shown, the upper ends of the levers are provided with gear teeth 9, and these teeth mesh with the teeth of racks 10 that are secured to the underside of the cross slides by screws 11. The lower ends 12 of both levers 7 and 8 are curved inwardly, and projecting inwardly from the levers, between the ends, are lugs 13 and 14, which lugs are slightly offset from the planes of the lower ends of the levers.

Keyed upon the shaft 15 is a disk 16 which is provided with a number of threaded perforations 17. These perforations extend parallel with the axis of the disk and are arranged in a circle about the shaft for the attachment of the cam blocks. A cam block 18 is adjustably secured to one side of the disk by bolts 19 which pass through slots 20 in the block and into threaded perforations in the disk. This cam block has a steep cam edge 21 and a gradual cam edge 22, in one plane, and offset therefrom a lug 23 with a steep cam edge 24. A cam block 25 is secured to the other side of the disk. This cam block is adjustably fastened by bolts 26 which pass through slots 27 in the blocks into threaded perforations in the disk. This block has a steep cam edge 28 and a gradual cam edge 29 in one plane, and an angularly arranged cam lug 30 projecting outwardly from one side. When the parts are assembled, the disk is located on the shaft between the levers and with the cams on the opposite sides in the planes of the ends of the levers.

The slides are shown in Fig. 3 as moved way out. When the cam shaft and disk keyed thereon are rotated in the direction indicated by the arrow in Fig. 3, the steep cam 21 on the cam block 18 engages the lower end 12 of the lever 7, and the steep cam 28 on the cam block 25 engages the lower end 12 of the lever 8. These surfaces of the cam blocks push the lower ends of the levers outward very quickly, and cause the upper ends of the levers to move the slides toward each other very rapidly, and bring the tools up to the stock to be operated upon. This position of the slides is illustrated in Fig. 2. At this time the gradual cam 22 of the cam block 18 and the gradual cam 29 of the cam block 25 engage the lower ends 12 of the levers 7 and 8 and push those ends outward more slowly and gradually, causing the upper ends of the levers to feed the tool slides toward each other with a slow and uniform motion while the tools are cutting. When the cuts are completed, the parts are in the positions shown in Fig. 1. At this time the quick incline 24 of the lug 23 that is offset from the cam block 18 engages the offset lug 13 of the lever 7, and the face of the angle cam lug 30 which projects from the cam block 25 engages the offset lug 14 on the lever 8. The engagement of these parts moves the upper ends of the levers outward very quickly and rapidly draws the tool slides from each other and the tools from the stock.

With this construction, the levers are moved by the cams on opposite sides of the same disk positively, first quickly for moving the slides so as to carry the tools up to the stock, and then slowly while the tools are cutting the stock. Afterward, by the engagement of the offset portions of the same cam blocks with the offset portions of the levers, the tool slides are moved from each other very rapidly for withdrawing the tools from the stock. The levers of course operate the slides independently of each other, and the cam blocks are adjustable upon opposite faces of the disks so that the relative times of the movement of the slides can be changed to effect the desired cuts. The cam blocks besides being readily adjustable, can be quickly removed and others substituted for effecting different relative movements if desired.

The invention claimed is:

1. The combination with a cross slide of a machine tool, of a lever engaging said slide, said lever having a part in one plane and a part offset therefrom, a shaft, and a cam rotatable with the shaft, said cam having a portion in one plane adapted to engage one part of the lever for moving it in one direction, and a portion offset therefrom for engaging the offset part of the lever for moving it in the opposite direction.

2. The combination with a cross slide of a machine tool, of a lever engaging said slide, said lever having a part in one plane and a part offset therefrom, a shaft, a disk fastened on said shaft, and a cam block adjustably secured to said disk, said cam block having a portion in one plane adapted to engage one part of said lever, and a portion offset therefrom and adapted to engage the offset part of said lever.

3. The combination with the cross slide of a machine tool, of a lever engaging said slide, said lever having a part in one plane and a part offset therefrom, a shaft and a cam rotatable with said shaft, said cam having a portion adapted to engage and move the lever first quickly and then slowly in one direction, and having a portion adapted to engage the offset part of said lever for moving the lever quickly in the opposite direction.

4. The combination with the cross slides of a machine tool, of levers engaging said slides, each of said levers having a part in one plane and a part offset therefrom, a shaft, and cams rotatable with said shaft, each of said cams having a portion in one plane adapted to engage a part of a lever, and a portion offset therefrom and adapted to engage the offset part of a lever.

5. The combination with the cross slides of a machine tool, of levers engaging said slides, each of said levers having a part in one plane and a part in a plane offset therefrom, a shaft, a disk fastened on said shaft, and cam blocks adjustably secured to opposite sides of said disk, each of said cam blocks having a portion adapted to engage a part of a lever, and having a portion offset therefrom and adapted to engage the offset part of a lever.

6. The combination with a cross slide of a machine tool, of a lever, a shaft and a cam rotatable with said shaft, said cam having a portion adapted to engage and move the lever in one direction, and a portion adapted to engage another part of the same lever and move it in the opposite direction.

HARRY BURDETT LESTER.

Witnesses:
WM. GRAY,
ALFRED PATTERSON.